UNITED STATES PATENT OFFICE.

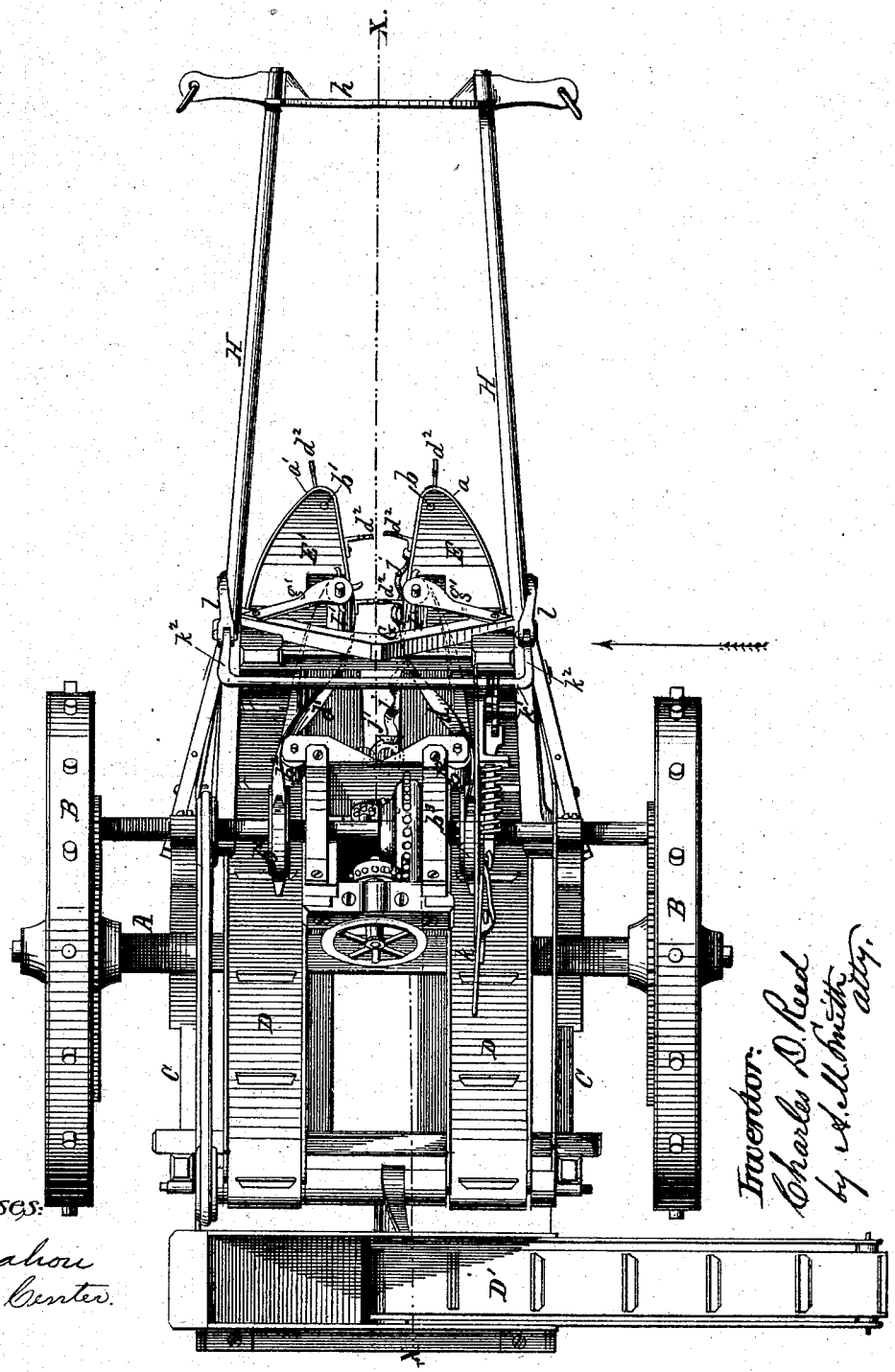

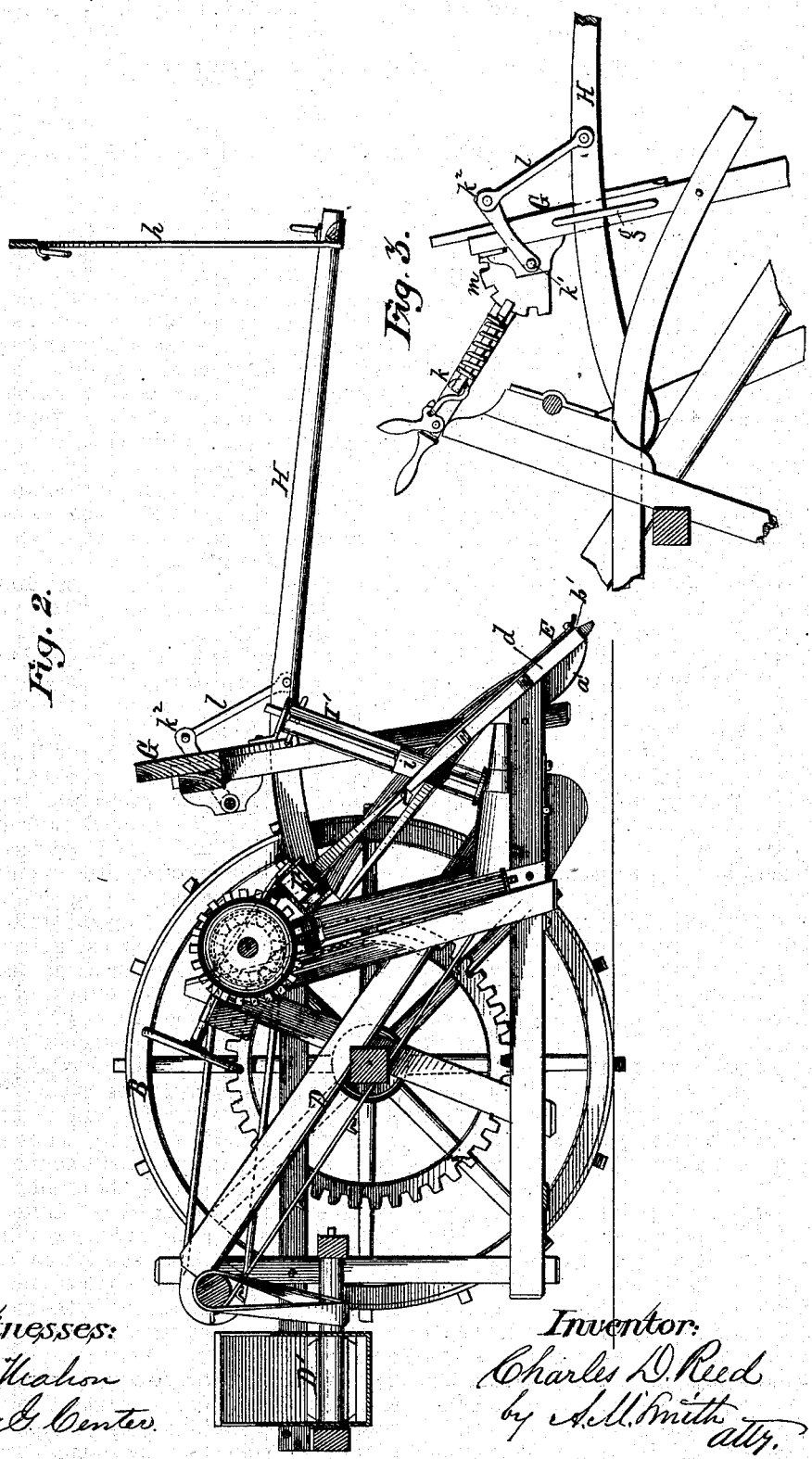

CHARLES D. REED, OF POLO, ILLINOIS.

IMPROVEMENT IN CORN-HARVESTERS.

Specification forming part of Letters Patent No. 186,497, dated January 23, 1877; application filed July 17, 1876.

*To all whom it may concern:*

Be it known that I, CHARLES D. REED, of Polo, county of Ogle, and State of Illinois, have invented certain new and useful Improvements in Corn-Harvesters, of which the following is a full, clear, and exact description, reference being had to the accompanying drawings, making part of this specification, in which—

Figure 1 is a plan or top view of a corn-harvester embracing my improvements. Fig. 2 is a vertical longitudinal section of the same on line $x\,x$, Fig. 1; and Fig. 3 is a side elevation, showing the devices for elevating and depressing the gathering-points or forward end of the machine.

Similar letters of reference denote corresponding parts wherever used.

My invention consists in a novel arrangement of endless belts provided with teeth or projecting spurs, and having an inward, backward, and upward movement, for picking up the stalks of the corn and insuring their proper presentation to the stripping devices, as hereinafter explained.

It further consists in a novel arrangement of upright reels having an inward and backward movement or rotation, for assisting the action of the toothed gathering-belts and the movement of the stalks toward, and their presentation to, the picking or stripping rollers, as hereinafter explained.

The machine, in its general plan of organization, is similar to that described in Letters Patent No. 166,633, granted to me August 10, 1875, for improvement in corn-harvesters, and it need not, therefore, be described in detail, except so far as is necessary to an understanding of my present improvements and modifications.

In the accompanying drawings, A represents the main drive-wheel axle; B B, the driving and carrying wheels mounted thereon, and C C' the divided main frame, divided centrally longitudinally to permit the reception and passage of the stalks, and upon which the picking-rollers and conveyer belts or aprons D D are mounted, arranged and operating substantially as in my former patent referred to, except that the conveyer-belts, instead of depositing the ears of corn in receptacles carried by the machine, discharge them upon an inclined transverse belt, D', by which they are carried to and deposited in suitable independent carts or wagons drawn at the side of the machine. The depressed forward ends of the divided main frame are provided each with a shoe or runner, $a$, adapted to run close to or upon the ground, if necessary, the upper faces of said shoes being inclined forward, as shown in Fig. 2; and upon said upper faces, and about perpendicularly thereto, are mounted friction-rollers $b\,b^1$, the shaft of which is stepped at its lower end in the shoe, the upper end having its bearing in a cover-plate, E or E'. Endless belts $d\,d^1$ pass around these rollers, and extend thence upward and to the rear, in the inclined position shown in Fig. 2, past suitable guide-rollers $b^2$, and around driving-pulleys $b^3\,b^4$ on the pinion-shaft and spur or bevel wheel shaft F, and to which motion is imparted by the drive-wheels B B by any suitable arrangement of gearing. The rollers $b\,b$ are placed well forward on the shoes $a\,a'$, in such manner that teeth or projecting spurs $d^2$ on the belts, in passing around in front of the rollers $b\,b^1$ from the outside inward toward each other, will overhang the points of said shoes, and said teeth, acting on the fallen stalks, will carry them inward until they are grasped between the opposing teeth of the belts, when they will be lifted up and carried backward toward the stripping or picking rollers. The main frame has secured to its forward end an upright transverse yoke-frame, G, open centrally to a sufficient height to pass over the corn-stalks, upon which frame the lifting-lever is mounted, and through suitable guiding and steadying loops $g$, on the sides of which the divided tongue or draft-frame bars H H pass, as shown in Figs. 1 and 3. The tongue-bars H H are united at their forward ends by an upright yoke or arch, $h$, which permits the passage of the stalks between said tongue-bars, the rear ends of which have a pivotal connection with the main frame, for permitting the vertical vibration of the latter relative thereto. Just in rear of the yoke-frame G are mounted two upright toothed rollers, I I', which incline slightly forward, as shown in Fig. 2, and have their upper bearings in brackets $g'$ on the yoke-frame. The rollers I I′, by preference, are corrugated as well as toothed, except at points $i$ $i$, near their lower ends, where the belts $d$ $d^1$ run in contact with them; and being rounded or made in pulley form at said points, they not only have an inward and backward rotation imparted to them by said belts, but they also act as guiding-pulleys to the belts themselves.

By this arrangement of the toothed rollers they are made to assist the action of the belts in lifting up falling stalks, and also in the operation of carrying the stalks backward to the picking-rollers. Underneath the gathering-belt $d$ and its cover-plate E is placed a spiral or screw, $j$, (see Fig. 1,) mounted in suitable bearing-brackets attached to the shoe or runner, or to the inner frame-timber, either or both, and provided at its rear end with a bevel-pinion, $j'$, to which motion is imparted by a bevel-wheel on the lower end of one of the picker-rollers, for rotating said screw or spiral rod. The direction of rotation given to said spiral rod is such as to cause it to assist the action of the gathering-belts $d$ $d^1$ and upright rollers I I′ in feeding or drawing the stalks backward to the picking-rollers. A smooth roller is mounted in bearings upon the opposing face or jaw of the divided frame, against which the stalks are crowded by the spiral $j$ in being drawn backward, and the smooth roller and spiral are both made tapering and diverging at their forward ends, to facilitate the admission of the stalks between them, and giving to the ears of corn or other bulky substance the upward motion of the spiral at this tapering opening to prevent clogging. The lifting-lever $k$ is secured to a transverse rock-shaft, $k^1$, mounted in suitable bearing-brackets on the rear face of the yoke-frame G, and the outer end of this shaft $k^1$ has crank-arms $k^2$ $k^2$ secured upon it, each connected by a link, $l$, with one of the tongue-frame bars H. These bars H rest upon the neck-yokes of the team, and are held at uniform height; consequently any vibration of the lever $k$ and crank-arms $k^2$ is imparted, through the yoke-frame G, to the main frame, for raising or depressing the points of the runners $a$ as desired, according to whether the machine is acting upon standing or fallen stalks, and this adjustment is readily effected, while the machine is in operation, by the driver riding in his seat thereon. The lever $k$, together with the main frame, is held at any desired point of adjustment by means of a rack, $m$, and a spring thumb-latch or pawl applied to the lever.

The picking-rollers and the devices for depositing the ears upon the conveyer-belts are substantially the same as the corresponding devices in my former patent.

Having now described my invention, what I claim as new, and desire to secure by Letters Patent, is—

1. The gathering and lifting belts $d$ $d^1$, inclined backwardly and upwardly, and provided with the teeth or projecting arms, adapted to operate in advance of the points of the shoes or runners for picking up the stalks, substantially as and for the purpose set forth.

2. The upright toothed rollers or reels I I′, in combination with the inclined gathering-belts $d$ $d^1$, arranged and operating substantially as described.

3. The combination of the toothed gathering-belts $d$ $d^1$ and the rotating spiral or screw $j$, arranged and operating as described.

4. The combination, with the upright reels I I′, of the spiral $j$, acting on the butts of the stalks, as described.

5. The combination, in a corn-harvester, of the gathering-belts $d$ $d'$, upright reels I I′, and rotating spiral rod $j$, all arranged and operating as described.

CHARLES D. REED.

Witnesses:
  MARTIN F. BASSETT,
  R. D. WOOLSEY.